United States Patent [19]
Anderson et al.

[11] 4,348,624
[45] Sep. 7, 1982

[54] THERMAL SERVO SYSTEM FOR MECHANICAL POSITIONING

[75] Inventors: Harold M. Anderson, Rancho Palos Verdes; Norman E. Marcum, Laguna Beach; Wilbur E. DuVall, Victorville, all of Calif.

[73] Assignee: Xerox Corporation, Stamford, Conn.

[21] Appl. No.: 126,736

[22] Filed: Mar. 3, 1980

[51] Int. Cl.³ .................................... G05D 23/275
[52] U.S. Cl. ............................... 318/634; 318/117; 318/641; 310/306; 60/528
[58] Field of Search ............... 318/117, 634, 641; 310/306; 60/528

[56] References Cited
U.S. PATENT DOCUMENTS

| 2,964,903 | 12/1960 | Porter et al. | 60/528 |
| 3,242,796 | 3/1966 | Strickler | 60/528 |
| 3,775,655 | 11/1973 | DuVall | 318/634 |
| 3,922,591 | 11/1975 | Olsen | 310/306 |
| 4,016,721 | 4/1977 | Richardson et al. | 60/528 |

Primary Examiner—R. L. Moses
Assistant Examiner—Eugene S. Indyk
Attorney, Agent, or Firm—Leonard Zalman

[57] ABSTRACT

A thermally controlled servo system in which a member supporting the drive for a device to be accurately positioned is moved relative to a stationary support member in response to changes in temperature of an elongated, tensioned member. Changes in temperature of the tensioned member are achieved by regulating the current flow through the tensioned member in accordance with a control signal derived from an error signal generated by the device to be positioned.

2 Claims, 8 Drawing Figures

THERMAL SERVO SYSTEM FOR MECHANICAL POSITIONING

A thermally controlled servo system in which a member supporting the drive for a device to be accurately positioned is moved relative to a stationary support member in response to changes in temperature of an elongated, tensioned member produced by regulating the current flow through the tensioned member.

BACKGROUND

Conventional disk drives generally utilize a stepper motor drive to move a read/write head assembly in a radial direction relative to the data tracks on the storage disk. In addition to data tracks, the disk generally includes one or more servo tracks which are read by the head assembly to provide a signal indicating actual head assembly position whereby accurate positioning of the read/write head assembly relative to a desired data track can be achieved. To provide initial alignment between the head assembly and a desired servo track, the head assembly drive of one type of conventional disk drive is mounted on a plate that rides in a slot in a casting member, and the head assembly drive is moved relative to the disk until a signal is generated that indicates that there is the desired alignment between the head assembly and the servo track. Once the desired alignment is achieved, the plate is fastened rigidly to the casting member.

The foregoing alignment is often carried out under temperature conditions that may fluctuate substantially from those encountered in disk drive operature. Temperature fluctuations often cause the disk to undergo dimensional distortions, such as, out of round, and such distortions can cause a deviation from the desired alignment between the head assembly and the servo track. Since the plate is fastened rigidly to the casting member in conventional disk drives, compensation for the aforenoted deviation cannot be effected.

BRIEF DESCRIPTION OF THE INVENTION

Pursuant to the invention, the plate supporting the head assembly drive is no longer rigidly fastened to the casting member, and dimensional distortions of a magnetic disk are compensated for by means of a thermal servo system which moves slightly the plate supporting the head assembly drive relative to the casting member. The relative movement is achieved by sensing the deviation from alignment between the head assembly and a servo track, and generating a signal which causes the plate supporting the head assembly drive to move in the desired direction to compensate for such deviation.

In a preferred embodiment, to permit movement between the head assembly drive supporting plate and the casting member, the mounting holes in the head assembly drive supporting plate are enlarged and the mounting screws are provided with shoulders, such as via washers, such that with limited screw tightening the plate can be moved slightly relative to the casting. A pretensioned wire, fastened at one end to a post rigidly secured to an end of the plate and at the other end to a post mounted in a slot at the opposite end of the casting (the slotted mount providing movement whereby initial alignment between the head assembly and the servo track can be achieved), is heated or allowed to cool, by a predetermined storage-controlled amount determined by the deviation from head track alignment, to cause expansion or contraction of the wire and corresponding slight movement of the plate relative to the casting member, thereby to correct for the deviation. The described thermally actuated servo system thusly provides correction of the head assembly position.

Modifying the temperature of the tensioned wire to provide the desired head assembly position correction is achieved preferrably by circuitry which includes a pulse amplitude to pulse width converter, a microprocessor, digital power amplifier, and a LC circuit in which the coil acts as the primary of a transformer the secondary of which is the tensioned wire whereby modification of the temperature of the wire occurs. The microprocessor generates a digital signal representing the pulse length of the signal supplied to it, and that digital signal is processed in the digital closed loop servo to determine the desired current through the tensioned wire to compensate for any sensed head assembly/servo track deviation. The latter signal is supplied to the digital power amplifier which sums the currents from a plurality of logic gates also supplied with a high frequency signal and supplies that signal to a transistor coupled to the LC circuit. The LC circuit is tuned to the frequency of the high frequency signal such that a constant current signal is supplied to the tensioned wire.

DETAILED DESCRIPTION OF THE INVENTION

Figure 1:
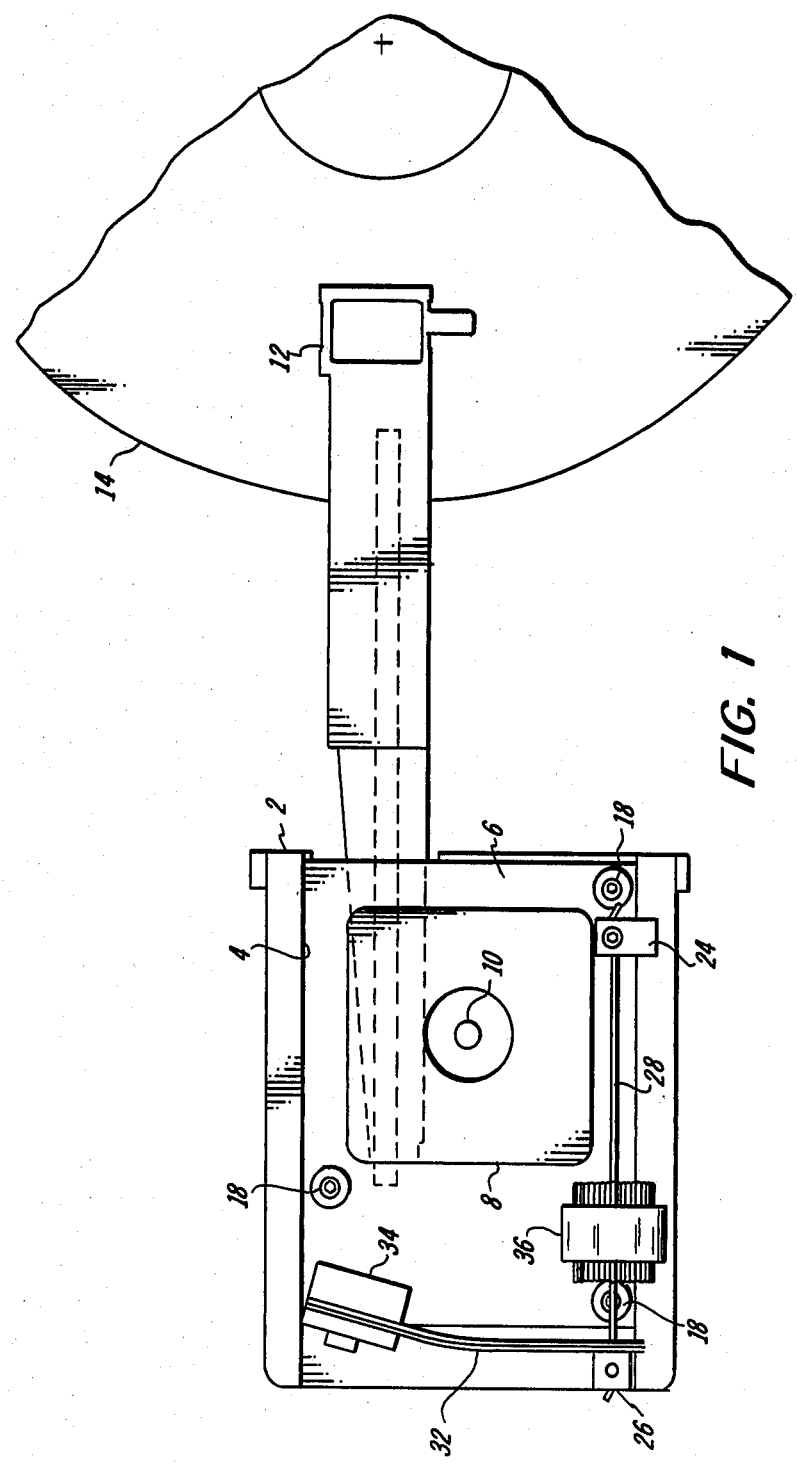
FIG. 1 is a top plane view of a head assembly in accordance with the invention.
Figure 2:
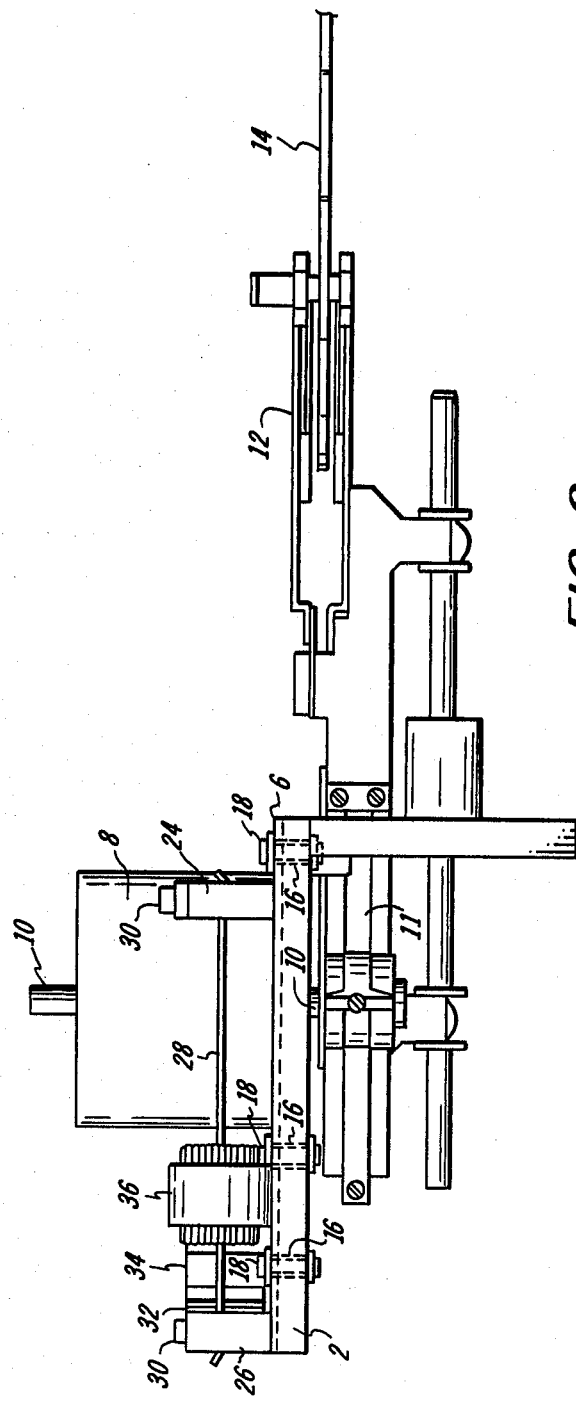
FIG. 2 is a side view of the head assembly of FIG. 1.

Referring now to FIGS. 1 and 2, there is shown a head actuator assembly including a rigid metallic supporting casting 2 having a surface slot 4 in which is situated a metal plate 6. Situated on top of plate 6 is a stepper motor 8 which, when energized, rotates a capstan 10 around which are wrapped steel bands 11 to drive a head assembly 12 in a radial direction relative to the tracks of a magnetic disk 14 (partially shown). The stepper motor drive and head assembly are of conventional designs, such as utilized in the Shugart SA 1000 disk drive.

Unlike conventional disk drives, the plate 6 is not immovably fastened to the casting 2, but instead is permitted to have some limited movement in the direction along the casting slot 4. Such movement is provided by making the diameter of the mounting holes 16 in the plate 6 slightly larger than the diameter of the mounting shoulder screws 18 and by making the length of the shoulder of each screw slightly longer (about 0.025 millimeter) than the thickness of plate 6. Thus, the screws will hold the plate 6 to the casting 2 but still allow some movement therebetween in the direction of the slot 4 as hereinafter described. The manner in which the plate 6 is permitted to slide slightly within the slot 4 is not critial and mechanical designs other than that described can be utilized to achieve the desired freedom of movement of the plate 6 within the slot 4.

A first post 24 is rigidly mounted to one end of plate 6 along one edge of slot 4 and a second post 26 is slideably mounted on casting 2 along that same edge of slot 4. The ends of a wire 28 are fastened to posts 24 and 26 by conventional fastening means, such as by set screws 30. A pretension is imparted to wire 28 by cantilever spring 32 which has its fixed end fastener to plate 6 by a post 34 and its moveable end abutting post 26. As an example, wire 28 can be a 0.020 inch diameter nichrome wire with a length of 2.5 inches between posts 24 and 26 and with a pretension of about 6 pounds provided by means of the cantilevered spring 32. Those values would cause the wire 28 to experience a load of about 1900 psi.

Encircling a portion of wire 28 is a toroidal winding 36 which acts as a primary of a transformer of which the wire 28 is a one turn secondary. As explained in detail hereinafter, application of current to the winding 36 causes temperature modification of wire 28 and consequential slight movement of the plate 6 and the head assembly drive that it carries relative to casting 2.

Figure 3:
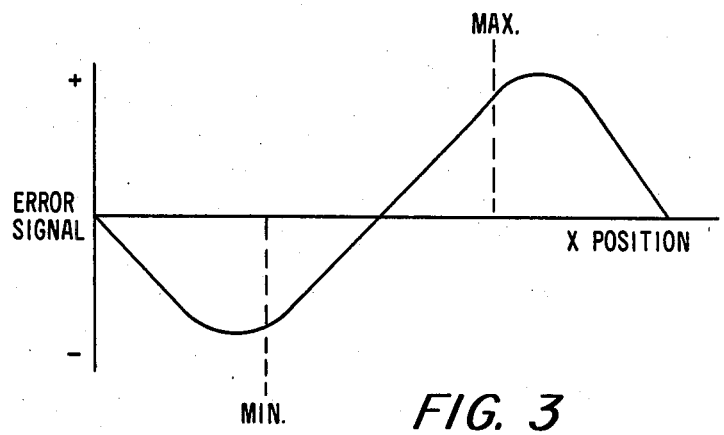
FIG. 3 is a graph of the error signal generated by the head assembly of FIG. 1 as a function of position from a servo reference track.

For initial utilization, the head assembly 12 is moved by the stepper motor 8 until the signal generated by the read head of the head assembly indicates that the head assembly is properly positioned over a desired servo track of disk 14. Once aligned, the shoulder screws 18 are tightened, but only to a torque that will allow some movement between plate 6 and casting 2 as previously described. With a fluctuation in ambient temperature, the disk 14 may undergo dimensional distortions that can cause a deviation from the desired head assembly/servo track alignment. Such deviated alignment will cause the read head of the head assembly to generate an error signal having a sign and magnitude determined by the direction and amount of the deviation, as shown by FIG. 3. The error signal is processed whereby a desired current is supplied to wire 28 to cause the wire to expand or contract whereby the plate 6 moves relative to casting 2 to correct for the noted deviation. If the head assembly is beyond the referencing servo track (that is to the right of it), the magnitude of the current flowing in wire 28 is reduced whereby wire 28 contracts and pulls the plate 6 to the left. If the head assembly is short of the referencing servo track (that is to the left of it), the magnitude of the current flowing in wire 8 is increased whereby the pull on wire 28 due to spring 32 is reduced and slight rightward movement of plate 6 is achieved.

Figure 4:
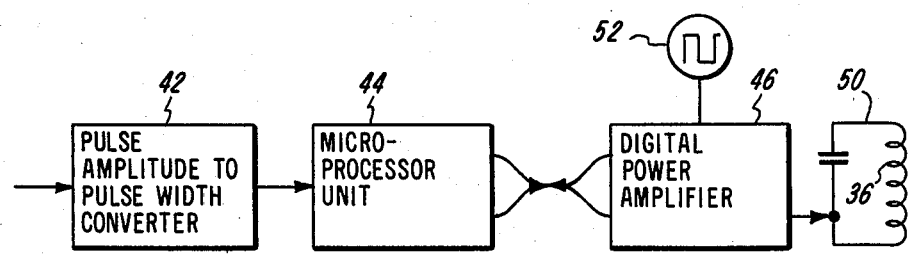
FIG. 4 is a block diagram of a circuit for generating a current that will effect movement of the head assembly of FIG. 1.
Figure 5:
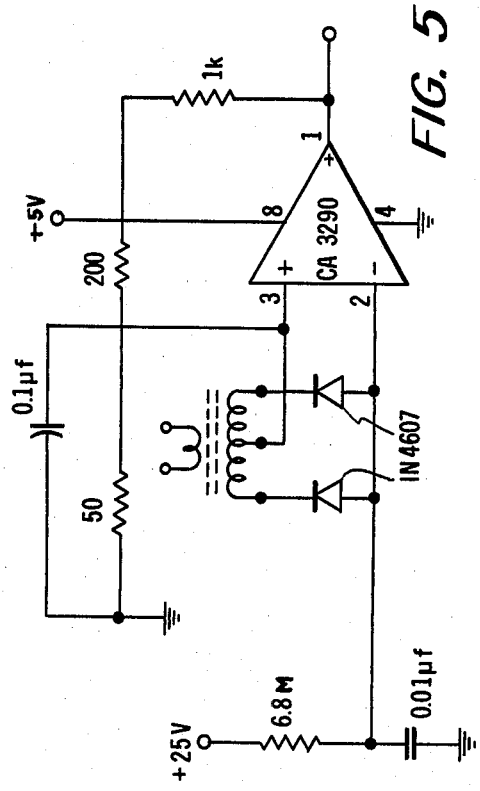
FIG. 5 is a schematic circuit diagram of a component of the circuit of FIG. 4.
Figure 6:
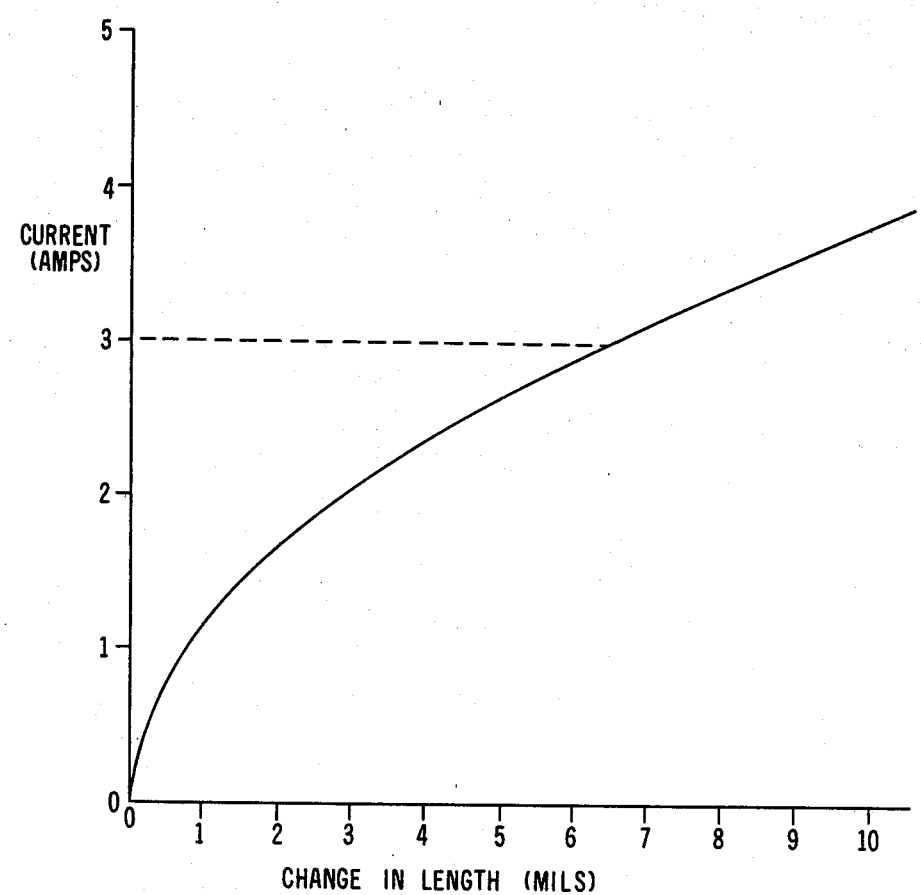
FIG. 6 is a graph showing change in length of a wire of specified material and diameter for various current therethrough.

The circuit 40 for processing the error signal of FIG. 3 is shown by FIG. 4. A pulse amplitude to pulse width converter 42, shown in detail in FIG. 5, receives the amplitude-varying error signal and produces an output signal having a length proportional to the amplitude of the error signal. The length-varying signal is supplied to a conventional microprocessor 44, which can be of the 6800 family and containing ROM and RAM memories. The ROM and RAM memories are in the form of digital tables equating deviation from head/track alignment to change in length required of wire 28 and current required through wire 28 to bring about that change in length. Referring to FIG. 6, there is shown a graph of current in amperes to change in length in mils of a 20 mil diameter nichrome wire. During initial mechanical alignment, wire 28 would be supplied with a 3 ampere current so that all subsequent servo corrections would be made on the linear portion of the graph of FIG. 6.

Microprocessor 44 generates a digital signal representative of the duration of the output signal of converter 42, as by counting how many clock pulses occur during its duration, and processes that signal in a conventional manner in its RAM and ROM memories to generate a binary output signal representative of the required corrective current to be supplied to wire 28. The output signal of microprocessor 44 is supplied in parallel to a digital power amplifier 46 which processes the digital signal to provide a current summed signal having a magnitude equal to a multiple of the current to be supplied to wire 28. The current summed signal from amplifier 46 is supplied to a LC circuit 50 which includes coil 36. Circuit 50 is resonant at the frequency of a reference signal which is supplied to amplifier 46 by source 52 whereby a constant current signal, stepped up by the ratio of the number of turns of coil 36 to wire 28, is generated in wire 28 to achieve desired movement of plate 6.

Figure 7:
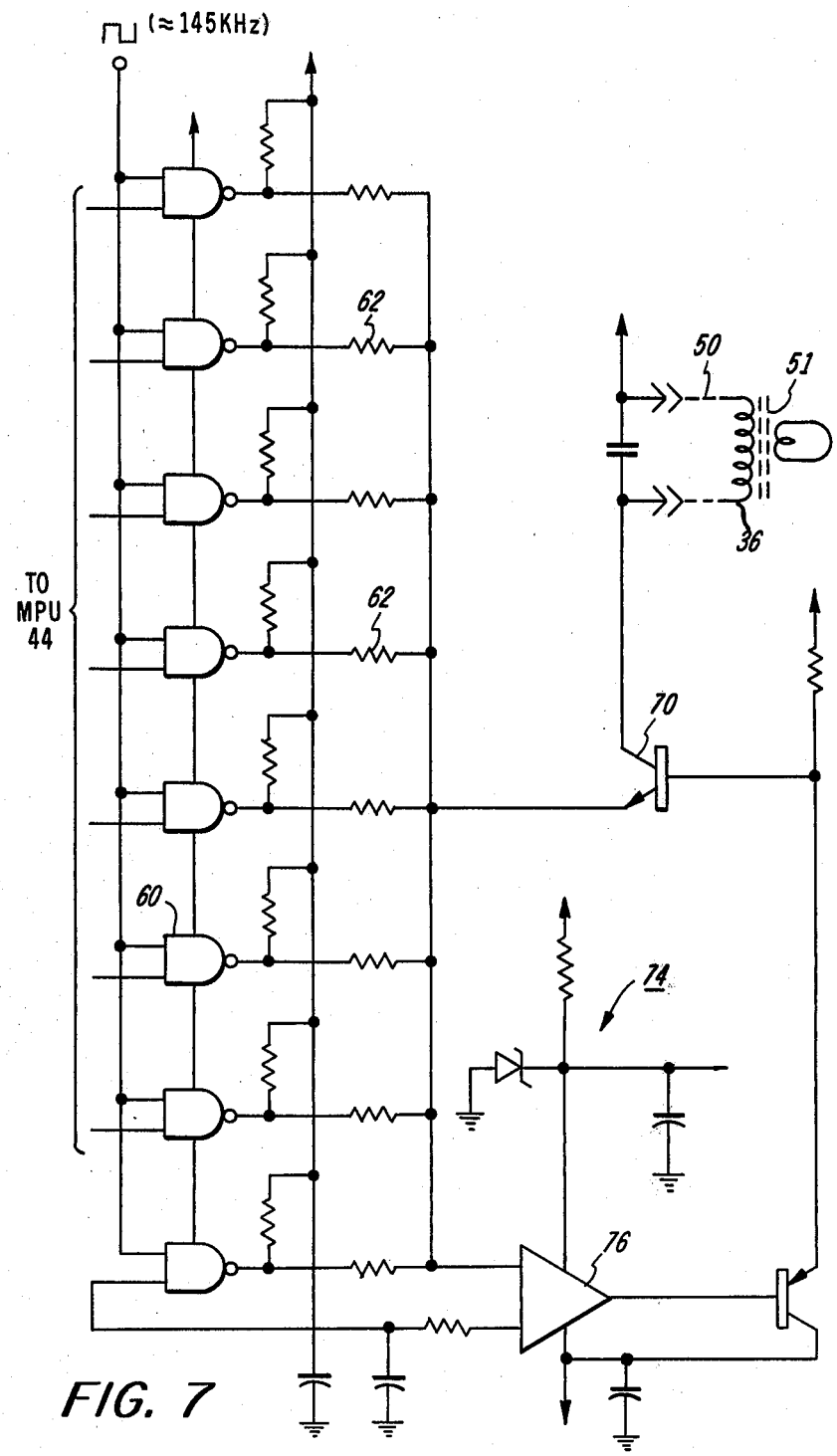
FIG. 7 is a schematic circuit diagram of an additional component of the circuit of FIG. 4.

A schematic circuit diagram of the digital power amplifier is shown in FIG. 7. The digital signal from microprocessor 44 is supplied in parallel to NAND gates 60 which also receive a 145 KHz reference signal from source 52. Resistors 62 coupled to the outputs of the gates 60 sum the current outputs of those gates 60 rendered conductive by the input from microprocessor 44 and that signal is supplied to the emitter of a transistor 70, as shown. The collector of transistor 70 is connected to LC circuit 50 which is tuned to a frequency of 145 KHz. The inductor 36 of LC circuit 50 is the primary of a transformer 51, such as a Torroid Micrometals, T44-3, having a turns ratio to its secondary (wire 28) of 16:1. To compensate for changes of $V_{be}$ of transistor 70 due to changes in temperature and current, a feedback loop 74 including op amp 76 is included in the digital power amplifier, as shown.

As a specific example, if wire 28 is of nichrome and 0.020 inches in diameter and 2.625 inches long, a $\Delta t$ of 207° F. would move plate 6 about 0.005 inches and a $\Delta t$ of 414° F. would move plate 6 about 0.010 inches. If the wire 28 is heated so that it experiences a 0.005 inch elongation during initial set up, equal to a 3 amp current through wire 28, the head assembly drive may be moved ±0.005 inches over the $\Delta t$ range of 0° F. to 414° F. An input of 6 watts would move the head assembly drive to midposition in one second (neglecting radiation and convection).

Figure 8:
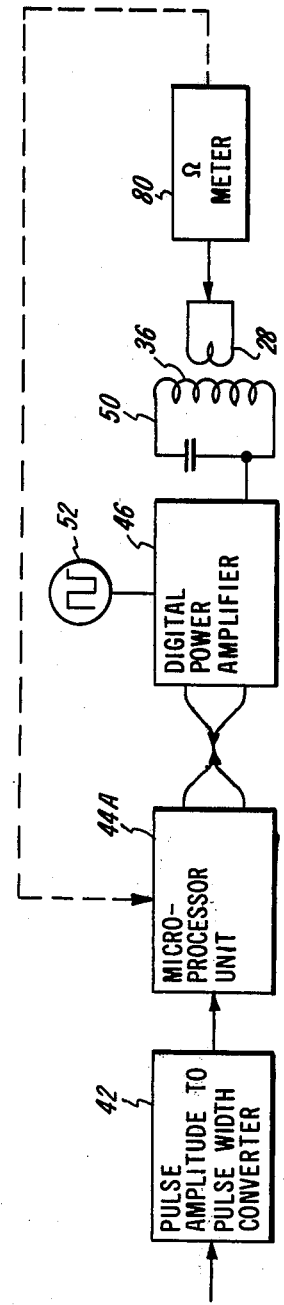
FIG. 8 is a block diagram of an additional circuit for head assembly positioning.

When the described assembly is used in some environments, the wire 28 may be exposed to drafts and cool air currents that will cause it to contract and thereby cause undesirable movement of the head assembly. To overcome that difficulty, the temperature of the wire can be sensed, as by measuring its resistance, and that signal could be supplied to the microprocessor 44 which, in this embodiment, would be programmed to supply to amplifier 46 the correct digital signal that will insure that the current through wire 28 is such that the sensed temperature will be maintained. FIG. 8 shows such an embodiment in which an ohmmeter 80 senses the resistance of wire 28 and supplies a control signal to a microprocessor 44a.

The thermally actuated control mechanism thus far described has been a thin metal wire. Other thermally actuated control mechanisms are also contemplated, such as, a metal band fastened to posts 24 and 26, or a plurality of thin wires fastened to posts 24 and 26 in a manner such that they act electrically in series and mechanically in parallel. The best configuration is believed to be a nichrome wire of 0.020 inch diameter, that configuration being chosen primarily on the basis of mechanical stiffness, minimum power dissipation and secondly on the basis of time response, wire resistance and maximum wire temperature.

Although the thermal servo of the invention has been described in reference to a magnetic information storage system, its usage is not intended to be so limited. For example, the thermal servo could be used to adjust the positioning of a carriage supporting a solid state laser of an optical disc storage system, or could be used for lens positioning. For another example, on a magnetic disk memory, the head assembly might have a multiplicity of tracks and no positioning system other than the thermal servo which servo would derive error signals from one or more of the tracks.

We claim:

1. A thermally controlled servo system for achieving accurate positioning of a member, comprising:

a support member having a fixed position;

a positioning member supported by said support member in a manner that permits said positioning member to have limited movement relative to said support member;

an elongated member supported by said support and positioning members, said elongated member being capable of supporting an electrical current and changeable in length in response to changes in its temperature due to changes in the magnitude of said electrical current; and control means for varying the magnitude of said electrical current in response to an error signal representing incorrect positioning of said positioning means;

said control means including memory means for generating a digital representation of the magnitude of the electrical current to be passed through said elongated member to correct said incorrect positioning, a digital power amplifier including a plurality of gates which receive said digital representation and an alternating current reference signal and a plurality of summing resistors for providing at the output of the digital power amplifier a current summed analog signal having a magnitude equal to a multiple of the currrent to be passed through said elongated member, and an inductor including tuned circuit coupled to said power amplifier and tuned to the frequency of said reference signal;

the inductor of said tuned circuit surrounding said elongated member, said inductor and said elongated member comprising a transformer whereby a constant current signal, stepped up by the ratio of turns of said inductor to said elongated member, is generated in said elongated member to provide changes in the temperature and length of said elongated member to thereby correct the position of said positioning member.

2. A thermally controlled servo system for achieving accurate positioning of a member, comprising:

a support member having a fixed position;

a positioning member supported by said support member in a manner that permits said positioning member to have limited movement relative to said support member;

an elongated member supported by said support and positioning members, said elongated member being capable of supporting an electrical current and changeable in length in response to changes in its temperature due to changes in the magnitude of said electrical current;

control means for varying the magnitude of said electrical current in response to an error signal representing incorrect positioning of said positioning means;

said control means including memory means for generating a digital representation of the magnitude of the electrical current to be passed through said elongated member to correct said incorrect positioning, a digital power amplifier including a plurality of gates which receive said digital representation and an alternating current reference signal and a plurality of summing resistors for providing at the output of the digital power amplifier a current summed signal having a magnitude equal to a multiple of the current to be passed through said elongated member, and an LC circuit coupled to said power amplifier and tuned to the frequency of said reference signal;

the inductor of said LC circuit surrounding said elongated member, said inductor and said elongated member comprising a transformer whereby a constant current signal, stepped up by the ratio of turns of said inductor to said elongated member, is generated in said elongated member to provide changes in the temperature and length of said elongated member to thereby correct the position of said positioning member, and means coupled to said elongated member for sensing the resistance of said elongated member to generate a feedback control signal, said control signal being supplied to said memory means.

* * * * *